(12) United States Patent
Schwankhart

(10) Patent No.: US 6,525,293 B2
(45) Date of Patent: Feb. 25, 2003

(54) METHOD FOR CLOSING AND/OR JOINING A CONNECTING JOINT OR JOINING SEAM BETWEEN TWO PIECES OF GALVANIZED SHEET METAL

(75) Inventor: Gerhard Schwankhart, Tuffeltsham (AT)

(73) Assignee: Inocon Technologie Ges.m.b.H., Attnang-Puchheim (AT)

(*) Notice: Subject to any disclaimer, the term of this patent is extended or adjusted under 35 U.S.C. 154(b) by 0 days.

(21) Appl. No.: 09/946,911

(22) Filed: Sep. 5, 2001

(65) Prior Publication Data

US 2002/0050487 A1 May 2, 2002

(30) Foreign Application Priority Data

Sep. 7, 2000 (AT) .............................................. 653/00 U
Jun. 7, 2001 (AT) .............................................. 459/01 U

(51) Int. Cl.[7] .............................................. B23K 10/00
(52) U.S. Cl. ........................... 219/121.59; 219/121.46; 219/121.47; 219/76.16; 219/85.13
(58) Field of Search ....................... 219/121.45, 121.46, 219/121.63, 121.64, 121.59, 121.53, 137.31, 85.13

(56) References Cited

U.S. PATENT DOCUMENTS

| | | | | |
|---|---|---|---|---|
| 4,081,656 A | * | 3/1978 | Brown ................... | 219/137.31 |
| 4,873,415 A | * | 10/1989 | Johnson et al. ......... | 219/121.64 |
| 5,821,493 A | * | 10/1998 | Beyer et al. ............ | 219/121.76 |
| 5,902,498 A | * | 5/1999 | Mistry et al. .......... | 219/121.46 |
| 5,938,948 A | * | 8/1999 | Oros et al. ............. | 219/121.46 |
| 6,198,068 B1 | * | 3/2001 | Lindstrom ............. | 219/121.46 |

FOREIGN PATENT DOCUMENTS

JP 07256463 10/1995

* cited by examiner

*Primary Examiner*—Mark Paschall
(74) *Attorney, Agent, or Firm*—Collard & Roe, P.C.

(57) ABSTRACT

A method for closing and/or joining a connecting joint or joining seam between two pieces of galvanized sheet metal, in which zinc or a zinc alloy whose melting point is similar to that of zinc is heated to melting temperature and is continuously introduced into the connecting joint, with the heating being performed by a plasma jet without reaching the melting temperature of the steel sheet. The use of a plasma jet allows processing zinc or, a zinc alloy without producing any disturbing zinc spatter. The zinc can be supplied as a wire, powder or granulate, whereby it is introduced under an inert-gas bell. This method can also be employed for post-galvanizing weld seams, with a second plasma jet welding set following a first one, it being mechanically coupled with the same and performing the galvanizing of the weld seam by the supply of zinc in wire form without melting the steel sheet anew. Tin foils are used in a special embodiment which are applied in the joining zone of a flanged edge.

8 Claims, 5 Drawing Sheets

METHOD FOR CLOSING AND/OR JOINING A CONNECTING JOINT OR JOINING SEAM BETWEEN TWO PIECES OF GALVANIZED SHEET METAL

The invention relates to a method of closing and/or joining a connecting joint or joining seam between two pieces of galvanized sheet metal.

Zinc coatings are used in sheet metal as protection from corrosion and are widely used in the production of motorcar body sheets. The further processing of such zinc-coated sheets poses difficulties, however, because the welding of such sheets is only possible with limitations with most welding methods. Zinc-coating causes a strong development of welding spatter. The zinc vapor disturbs the welding process during arc welding to a high extent because the arc becomes unstable and leads to increased wear and tear of the cathodes and the cathodic evaporation of the zinc at unfavorable locations. Moreover, the use of tungsten inert-gas welding (TIG welding) which is preferably employed in the case of light sheets is strongly impaired by the occurrence of said zinc spatter.

A usual procedure is therefore to produce a joint with mechanical methods (e.g. edge-forming) and to fill up any remaining gaps in the joint with glues in order to strengthen the joint. As a result of the known disadvantages of gluing (e.g. the necessity of slip-free fixture of the parts to be glued or the pretreatment of the surfaces, low permanent strength), soldering methods are also used. Due to the problematic properties of zinc, special solders are used such as copper/silicon solders. These solders lie with their processing temperature in the zone of the melting point of zinc or below, so that the zinc does not evaporate. The disadvantages are the high costs for these special solders and the unpleasant effect that these solders diffuse through the varnish layer after the varnishing and the soldering paths become visible as discolorations.

It is the object of the present invention to provide a method of the kind mentioned above which avoids these disadvantages and maintains the advantages of soldering.

This is achieved in accordance with the invention by filling the connecting joint or covering the joining seam with an additional material selected from the group consisting of zinc, a zinc alloy whose melting point is similar to that of zinc, tin, and a tin alloy by continuously introducing the additional material into the connecting joint or onto the joining seam, and heating the additional material to melting temperature by a plasma jet to melt without reaching the melting temperature of the sheet metal.

It has been seen that zinc and zinc-coated materials can be processed by using a plasma jet without any considerable production of zinc spatter. By using zinc as a joining material a material is used which is generically identical to galvanized sheet steel and has the same melting point as zinc coating, so that a discoloration of the varnishing through diffusion is prevented over long periods of time.

The plasma jet is produced by a plasma jet welding set, with the temperature of the plasma being situated above the melting point of zinc but under the melting point of the workpieces to be joined.

The spatter-free processing of zinc with a plasma jet is caused by the special properties of plasma. Plasma is a moving electric conductor which is flowed through by current and thus forms a concentric electromagnetic field about itself which constricts the plasma jet in its diameter. The zinc introduced into the plasma is ionized and is thus also subjected to the constriction effect, which suppresses the formation of zinc spatter.

The plasma jet welding set need not have any special embodiment. The regulation of the optimal energy supply at which the temperature of the plasma is over the melting point of zinc but is below the melting point of the workpieces to be joined is carried out in such a way that different parameters such as power setting of the source of current, advance speed, shape and size of nozzle, type of cold gas and its flow quantity, distance of the cathode from the workpiece and the surface at the cathode tip are adjusted to one another in a suitable way.

In one embodiment of the invention, the workpieces to be joined are already adhered to one another by mechanical pre-treatment, with said joint being strengthened by closing any still existing connecting joints in accordance with the invention.

If the plasma jet is enclosed by an inert-gas envelope and said inert-gas envelope is adjusted to the shape of the connecting joint or joining seam, the zinc can still be applied on the workpiece. Heated metallic workpieces bond rapidly with oxygen and form an oxide layer which prevents the wetting with the molten zinc. By supplying the zinc under an inert gas cover, oxidation is prevented and the quality of the connection is thus improved. In order to obtain a higher strength, it is also possible to use an alloy made of zinc and nickel for example.

The zinc and zinc alloy can be supplied as a wire, powder or granulate.

During the welding of galvanized sheet metal, the zinc coat, and thus the protection from corrosion, is destroyed along the joining seam. With the method of the invention, the advantageous possibility is offered to apply a zinc coat onto the joining seam without any disturbing zinc spatter by means of a plasma jet and to thus reproduce the protective zinc coating again. This is achieved in such a way that a plasma jet welding set which carries out the galvanization of the joining seam is provided downstream of a first welding set which is responsible for the welding process, with both devices being coupled. The energy transmission onto the material is regulated in the plasma jet welding set in such a way that the melting temperature of the zinc is reached, but not that of the steel sheet. The zinc is supplied in wire form, During the welding process of the first device, it is also possible to use other welding additives. An online re-galvanization of welding paths is thus enabled. The production of zinc spatter is thus avoided by the use of the plasma method.

The method may be used in the production of doors in the car industry in which, among other things, two galvanized pieces of sheet metal are joined together in such a way that the joint forms the edge of the door. This is produced by means of special edge-forming in which a piece of sheet metal with an L-shaped cross section and a piece of sheet metal with a straight cross section are placed above one another in such a way that the straight piece of sheet metal rests in the L-shaped bend of the other piece of sheet metal. The shorter leg of the L-shaped sheet metal is then bent and the plane piece of sheet metal comes to lie in a kind of bracket of the now U-shaped other piece of sheet metal. The joint thus produced can now be strengthened with the help of the method in accordance with the invention. Tin is used as additional material and accordingly applied as a foil in the joining zone and molten by using a plasma jet without the occurrence of any disturbing zinc spatter.

The invention is now explained by reference to the enclosed drawings, wherein.

Figure 1:
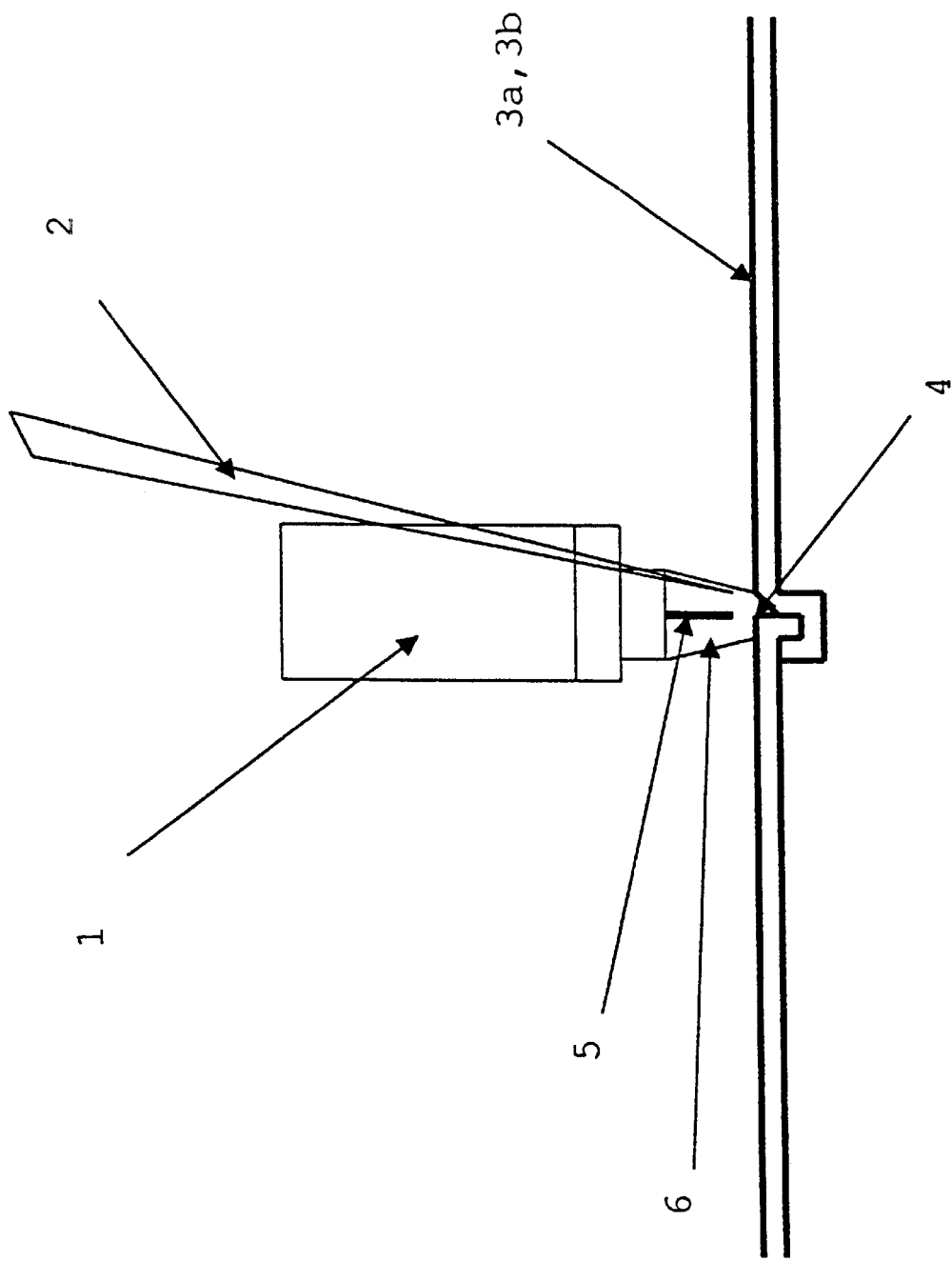
FIG. 1 shows the schematic arrangement during the closure of connecting joints between the galvanized sheet metal by using a plasma jet welding set and a zinc wire.
Figure 2:
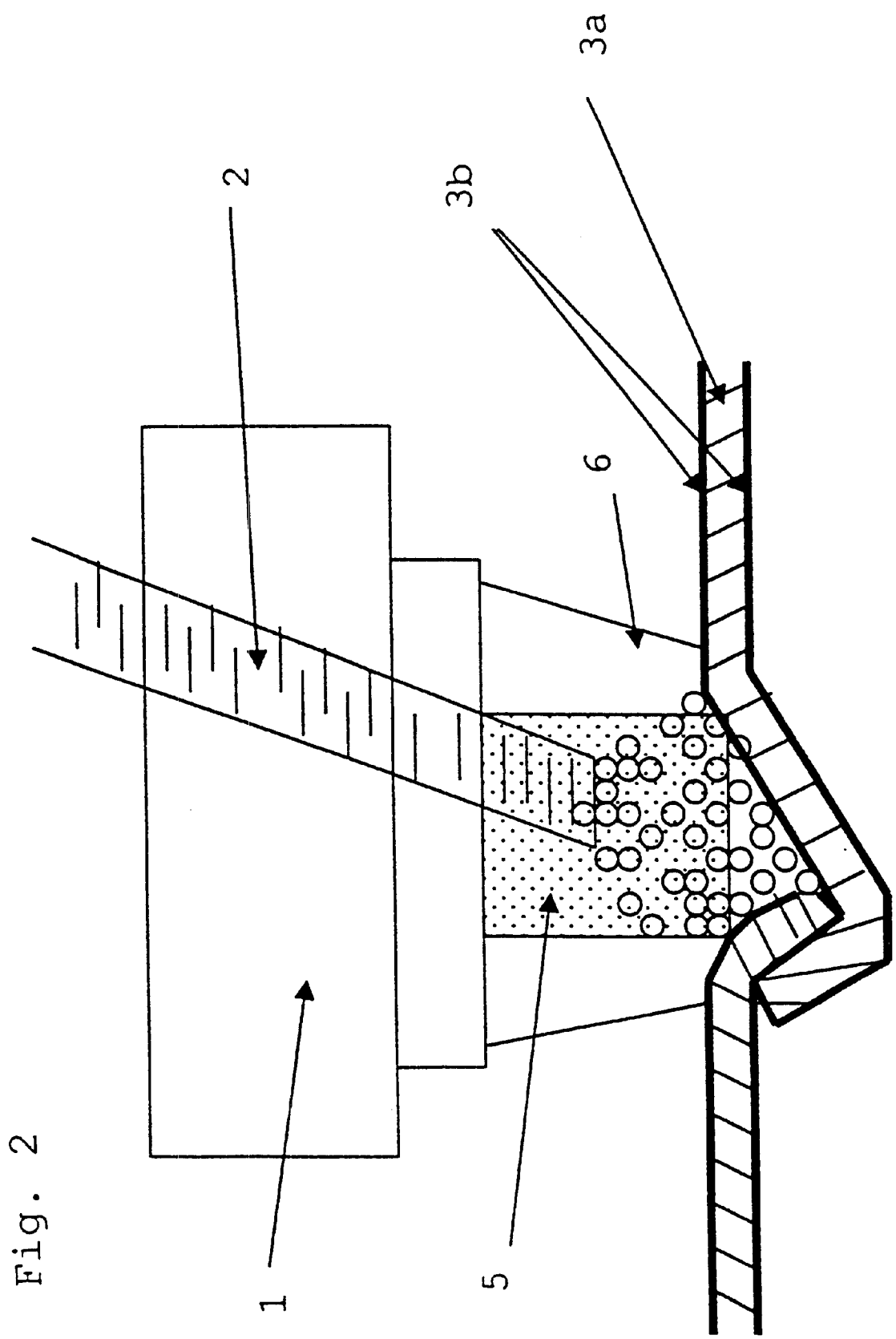
FIG. 2 shows an example of a connecting joint to be closed with zinc between two steel sheets for strengthening the joint.

The plasma jet (5, FIG. 1) is produced by a respective plasma jet welding set (1), with the plasma jet (5) making the zinc wire (2) melt, but not the steel sheet parts (3a) to be joined. The zinc wire (2) melts and fills the connecting joint (4). Preferably, the zinc wire (2) has a diameter of between 0.8 and 1.6 mm which is conventionally necessary for wire feeding devices. As a result of the special properties of the plasma (5), however, spattering of the zinc is prevented. As a result of the simultaneous injection of an inert gas, e.g. argon or helium, an inert gas envelope (6) produced about the melting bath of the liquid zinc in the connecting joint (4) which prevents the contact of atmospheric oxygen with the liquid zinc, as also with the heated parts of the galvanized steel sheet parts (3a, 3b) to be joined. Optimal wetting of the connecting joint (4) with the liquid zinc is thus ensured. The inert gas bell is thus adjusted to the shape of the connecting joint. In the case of a long straight seam one preferably uses a narrow long inert gas bell, whereas in the case of an orbital seam the lower edge is provided with the radius of the pipe sections to be joined with a small play. The plasma jet (5) is guided along the connecting joint (4) and the joint is closed by a continuous supply of zinc wire (2) without giving rise to any problematic zinc spattering. The zinc can also be supplied as a zinc alloy whose melting point is similar to that of zinc, or as a powder or granulate. Powder or granulate are conveyed with the inert gas stream (6) to the location of the joint (4). The connection between the galvanized steel sheets is thus strengthened by the introduction of a generically similar material.

Figure 3:
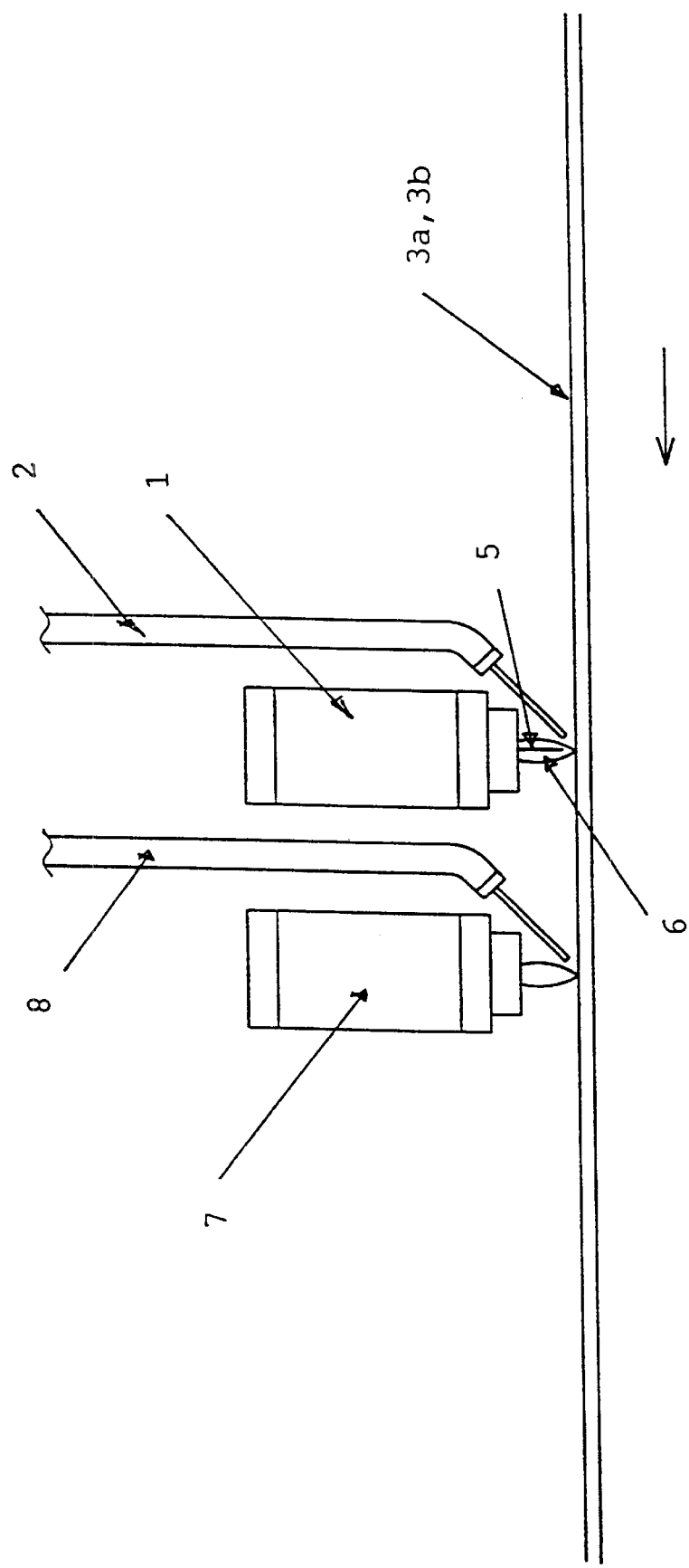
FIG. 3 shows the schematic arrangement during the re-galvanizing of sheet metal.
Figure 4:
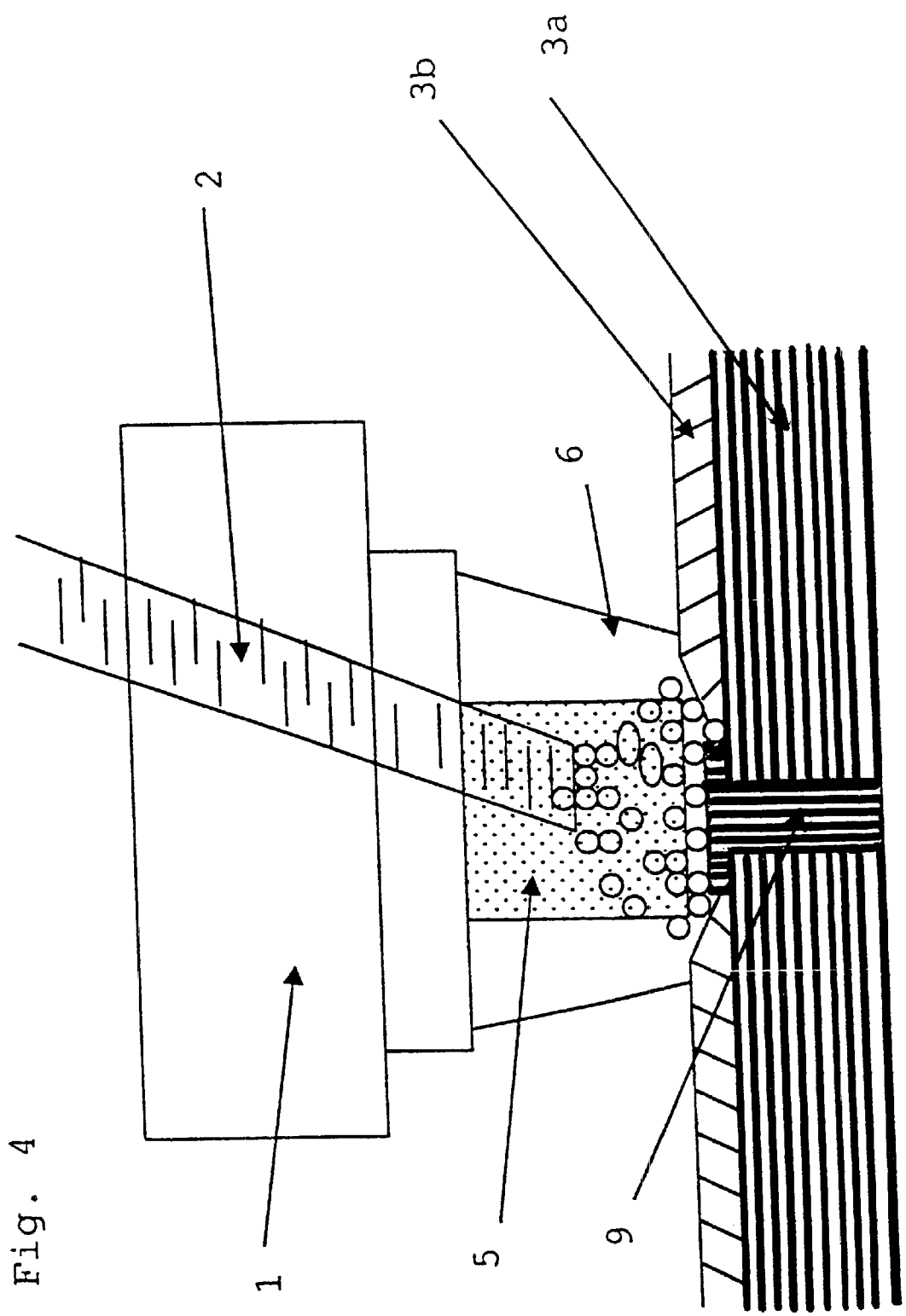
FIG. 4 shows the connecting joint to be closed with zinc following a preceding welding process for the purpose of re-establishing the corrosion protection.

A further embodiment of the invention is shown in FIGS. 3 and 4. The zinc layer (3b) is destroyed by welding zinc-coated sheets (3a), as is schematically illustrated in FIG. 4. The thus produced joining seam (9) is thus no longer covered with a zinc layer, so that there is no protection from corrosion. Said joining seam (9) can be closed with the method in accordance with the invention by melting zinc in a temperature-controlled manner with a plasma jet. The plasma jet (5, FIG. 3) is produced by a respective plasma jet welding set (1) again, with the energy input of the plasma jet (5) being dimensioned in such a way that it makes the zinc wire (2) melt, but not the steel sheet parts (3a) to be joined. The zinc wire (2) melts and closes the joining seam (9) which is produced by the preceding welding process of a fore-running welding set (7). The fore-running welding set (7) and the trailing plasma jet welding set (1) are coupled in such a way that they start and stop their advance jointly. Since both apparatuses (7, 1) need to make a different energy contribution, they must not be electrically coupled. Each apparatus (7, 1) is equipped with its own power supply and is regulated separately. Both apparatuses (7, 1) are preferably mounted on a common advance apparatus and move along the weld seam produced by the fore-running welding set (7) in such a way that an even closure of the joining seam with a zinc layer is achieved and complete corrosion protection is established once again. The fore-running welding set (7) is preferably also a plasma jet welding set. Any desired additional material can be used for the weld seam (8) of the fore-running welding set (7). It is also possible to omit the same entirely. Spattering of the zinc is again prevented by the special properties of the plasma (5).

A further embodiment of the invention is shown in the FIGS. 5 to 8. It concerns a special variant for car doors or flaps.

Figure 5:
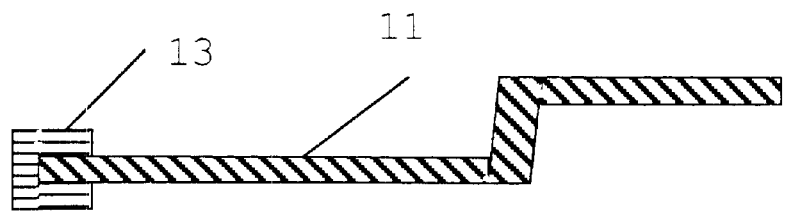
FIG. 5 shows a schematic view of a sheet metal which is to be connected with another sheet according to a special embodiment.
Figure 6:
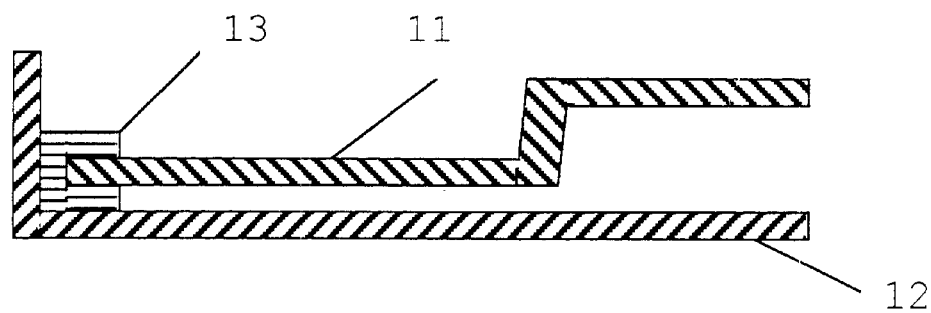
FIG. 6 shows a schematic view of the sheets to be joined and their relative fixture prior to the edge-forming of the outer sheet.
Figure 7:
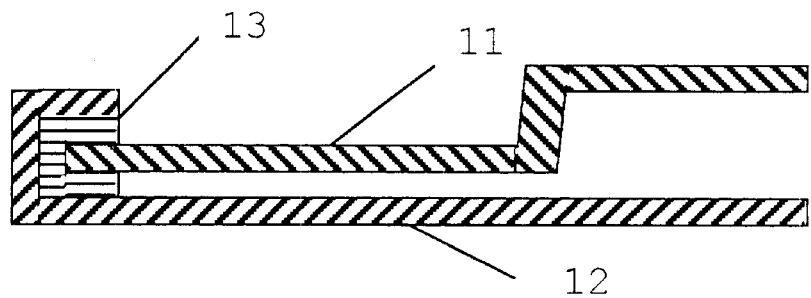
FIG. 7 shows a schematic view of the sheets to be joined after the edge-forming of the outer sheet.

FIG. 5 shows schematically how additional material is applied in form of a foil 13 about an edge of the inner sheet 11 by edge-forming. Sheet 11 is the frame of the door body for example; sheet 12 (FIG. 6) is the lining and forms in the edge-formed state the door edge. The edge-formed zone is provided with a foil 13, preferably made of tin or a copper-silicon alloy, e.g. $CuSi_3$. The foil 13 can be produced with or without flux additament. It does not contain any lead and cadmium, however. Foil 13 can be additionally pressed by means of elastic section rollers, as a result of which it adheres tightly to the edge crest of inner sheet 11 and is sufficiently fixed for the further processing steps. The inner sheet 11 which is flanged with foil 13 is thereafter placed into the pre-bent outside sheet 12, thus producing a relative arrangement of inner sheet 11 and outer sheet 12 according to FIG. 6. The outer sheet can now be flanged over, so that it encloses the foil 13 with the additional material and the inner sheet 11 (FIG. 7).

Figure 8:
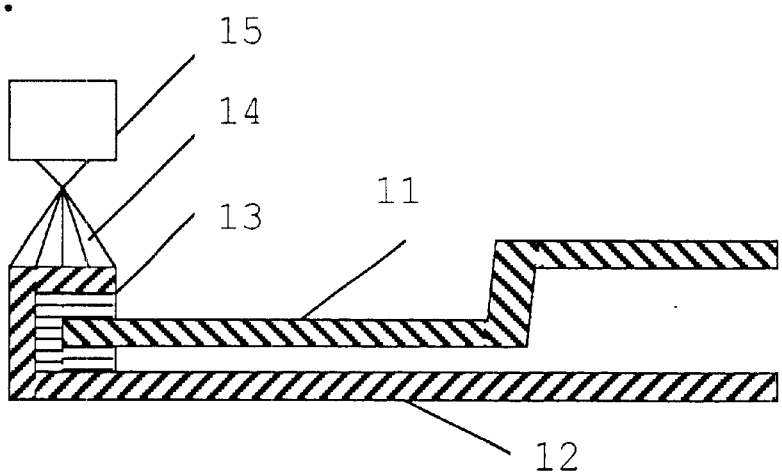
FIG. 8 shows a schematic view of the sheets to be joined after the edge-forming and during the application of a plasma jet according to a special embodiment.

As is shown in FIG. 8, the zone of the flange is thereafter heated with a plasma jet 14, with the plasma source 15 preferably being disposed at a distance of between 8 and 12 mm, preferably 10 mm, from the sheets 11, 12. The additional material 13, which was preferably applied as a foil, melts and begins to flow into the joining zone between inner sheet 11 and the outer sheet 12. Although the additional material 13 is molten by the plasma jet 14, this is not the case with the zinc coating of the sheets 11, 12 and the sheets 11, 12 per se.

After using the plasma jet 14, the additional material 13 has filled and sealed off the joining zone in the zone of the flange. The zinc coating continues to remain intact and prevents corrosion. The car door is immediately solid and can be further handled with high speed, e.g. it can be varnished for example.

In most cases, the inner and outer sheets 11, 12 to be processed will be soiled with a slight oil film due to the preceding production and processing steps. In such cases a pre-treatment is advantageous which on the one hand removes the oil film and on the other hand also removes oxide layers from the usually zinc-coated sheet surfaces and thus "activates" them. A pulsed plasma jet is well suited for this task because it achieves cleaning and activation of the sheet surfaces without impairing the zinc coating.

The advantages of this embodiment of the invention are that the joining zone of the two sheets 11, 12 is immediately resistant to warping after the plasma jet treatment, whereas during the usual gluing of the sheets the joint will become solid only after a longer period of time and the sheets need to be treated in the meantime very carefully. Moreover, the joining of two sheets according to this embodiment can occur more rapidly, since in comparison with gluing, fewer processing steps are necessary. The strength of the joint is considerably higher than with gluing techniques, which also allows lighter door constructions.

What is claimed is:

1. A method of closing and/or joining a connecting joint or joining seam between two pieces of galvanized sheet metal, comprising the steps of
   (a) filling the connecting joint or covering the joining seam with an additional material selected from the group consisting of zinc, a zinc alloy whose melting point is similar to that of zinc, tin, and a tin alloy by continuously introducing the additional material into the connecting joint or onto the joining seam, and
   (b) heating the additional material to melting temperature by a plasma jet to melt without reaching the melting temperature of the sheet metal.

2. A method as claimed in claim 1, wherein the plasma jet is enclosed by an inert-gas envelope and said inert-gas envelope is adjusted to the shape of the connecting joint or joining seam.

3. A method as claimed in claim 1, wherein the zinc or zinc alloy is supplied as a wire, powder or granulate.

4. A method as claimed in claim 1, wherein the pieces of galvanized sheet metal are joined by edge-forming and remaining gaps are closed by the plasma jet traveling along the gaps.

5. A method as claimed in claim 1, wherein the joining seam is the result of a preceding welding.

6. A method as claimed in claim 5, wherein joining of the joining seam is performed by a plasma jet welding set which follows a first welding set and is mechanically coupled with the same.

7. A method as claimed in claim 1, wherein the additional material in the form of a foil is placed on one of the two pieces of galvanized sheet metal, the two pieces of galvanized sheet metal are edge-formed in a joining zone, with the foil being disposed in the edge-formed zone between the two pieces of galvanized sheet metal, and the edge-formed zone thereafter is heated by means of the plasma jet.

8. A method as claimed in claim 7, wherein the distance of the tip of the plasma jet from the pieces of galvanized sheet metal is between 8 and 12 mm.

* * * * *